United States Patent [19]

(12) United States Patent
Veits

(10) Patent No.: US 7,499,448 B2
(45) Date of Patent: Mar. 3, 2009

(54) METHOD FOR DATA EXCHANGE BETWEEN NETWORK ELEMENTS IN NETWORKS WITH DIFFERENT ADDRESS RANGES

(75) Inventor: Oliver Veits, Dachau (DE)

(73) Assignee: Siemens Aktiengesellschaft, Munich (DE)

( * ) Notice: Subject to any disclaimer, the term of this patent is extended or adjusted under 35 U.S.C. 154(b) by 566 days.

(21) Appl. No.: 10/554,159

(22) PCT Filed: Mar. 5, 2004

(86) PCT No.: PCT/EP2004/002264

§ 371 (c)(1),
(2), (4) Date: Oct. 21, 2005

(87) PCT Pub. No.: WO2004/100498

PCT Pub. Date: Nov. 18, 2004

(65) Prior Publication Data

US 2006/0227769 A1  Oct. 12, 2006

(30) Foreign Application Priority Data

May 12, 2003  (DE)  ............... 103 21 227

(51) Int. Cl.
*H04L 12/56* (2006.01)
(52) U.S. Cl. ............... 370/389; 709/245
(58) Field of Classification Search ............ 370/389, 370/392, 352, 401; 709/223, 228, 245
See application file for complete search history.

(56) References Cited

U.S. PATENT DOCUMENTS 6,006,272 A  12/1999  Aravamudan et al.
2001/0039576 A1* 11/2001  Kanada ............ 709/223

2002/0101859 A1  8/2002  Maclean (Continued)

FOREIGN PATENT DOCUMENTS

DE  10119447 A1  10/2002

(Continued)

OTHER PUBLICATIONS

Paulsamy, V.; Chatterjee, S., "Network convergence and the NAT/Firewall problems," System Sciences, 2003. Proceedings of the 36th Annual Hawaii International Conference on , vol., No., pp. 10 pp.-, Jan. 6-9, 2003.*

(Continued)

*Primary Examiner*—Hassan Kizou
*Assistant Examiner*—Jeffrey M Rutkowski

(57) ABSTRACT

The invention relates to a method for data exchange between network elements with a first network element, arranged in a first network domain with address valid in the first network domain, a second network element, arranged in a second network domain with an address valid in the first network domain and a network gateway, arranged between the network domains, for the forwarding of a data packet for sending, from the first network element to the second network element, said data packet comprising a characterizing range and a data range. In the characterizing range of the data packet, a conversion of the target address, characterizing the receiving network element, into a target address valid in the second network domain is carried out under control of the network gateway. The first network element thus enters the source address thereof to be entered in the data range of the data packet as the source address of the first network element valid in the second network in the data range.

13 Claims, 4 Drawing Sheets

U.S. PATENT DOCUMENTS

| | | |
|---|---|---|
| 2002/0133549 A1 | 9/2002 | Warrier et al. |
| 2002/0138622 A1* | 9/2002 | Dorenbosch et al. ........ 709/227 |
| 2002/0141390 A1* | 10/2002 | Fangman et al. ............ 370/352 |
| 2002/0159447 A1* | 10/2002 | Carey et al. ................. 370/389 |
| 2003/0048780 A1* | 3/2003 | Phomsopha ................. 370/389 |
| 2003/0110292 A1* | 6/2003 | Takeda et al. ............... 709/245 |
| 2003/0161295 A1* | 8/2003 | Shah et al. .................. 370/352 |
| 2003/0233471 A1* | 12/2003 | Mitchell et al. ............. 709/238 |
| 2004/0001509 A1* | 1/2004 | Zhang et al. ................ 370/466 |
| 2004/0037268 A1* | 2/2004 | Read .......................... 370/352 |
| 2004/0052257 A1* | 3/2004 | Abdo et al. ................. 370/392 |
| 2004/0057385 A1* | 3/2004 | Roshko ...................... 370/252 |
| 2004/0059942 A1* | 3/2004 | Xie ............................ 713/201 |
| 2004/0064584 A1* | 4/2004 | Mitchell et al. ............. 709/245 |
| 2004/0252683 A1* | 12/2004 | Kennedy et al. ............ 370/389 |

OTHER PUBLICATIONS

J. Rosenberg, J. Weinberger, C. Huitema, R. Mahy; "STUN—Simple Traversal of User Datagram Protocol (UDP) through Network Address Translaters (NATs)"; Network Working Group, Request for Comments: 3489; Category: Standards Track; Mar. 2003; pp. 1-47.

* cited by examiner

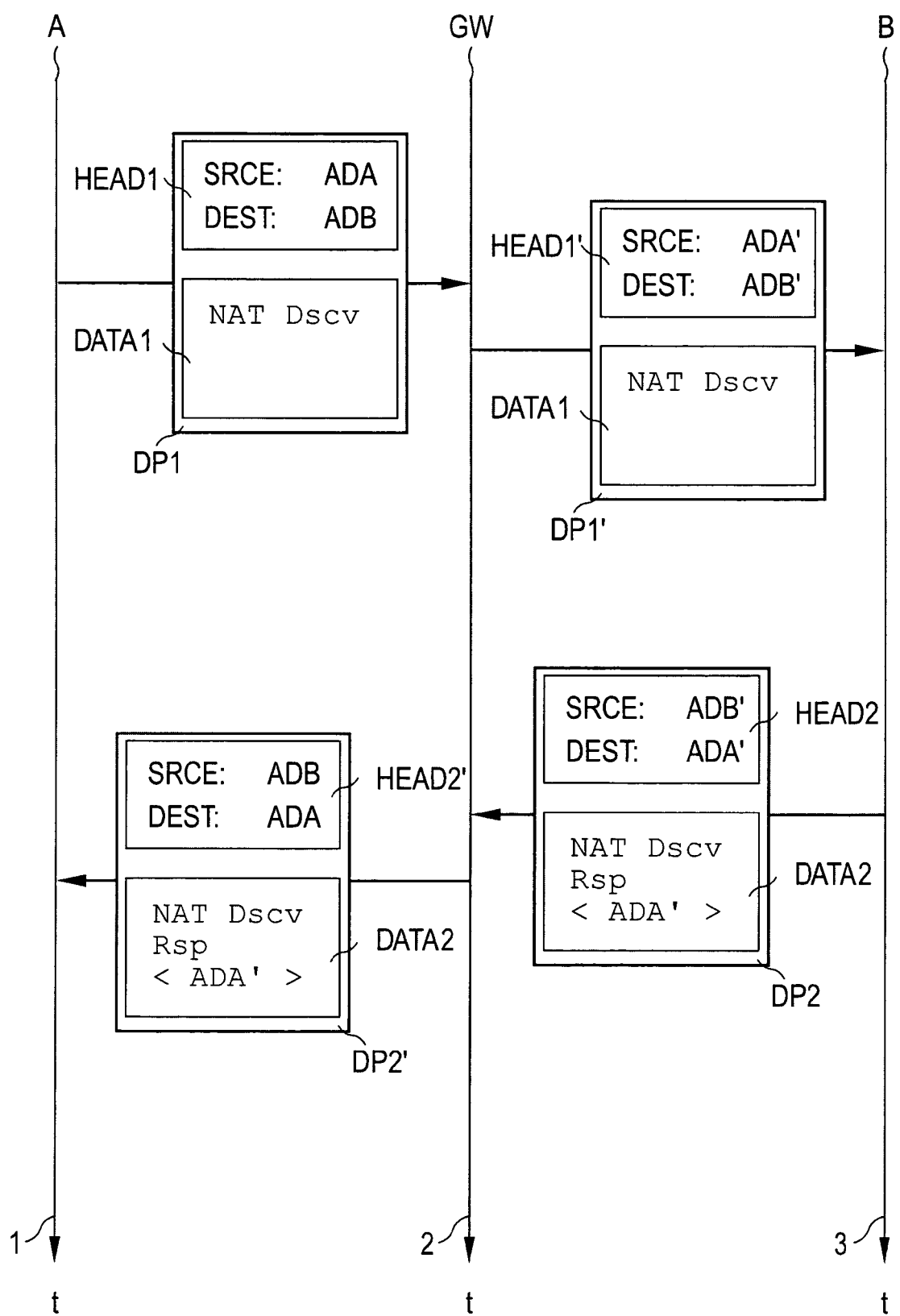

METHOD FOR DATA EXCHANGE BETWEEN NETWORK ELEMENTS IN NETWORKS WITH DIFFERENT ADDRESS RANGES

CROSS REFERENCE TO RELATED APPLICATIONS

This application is the US National Stage of International Application No. PCT/EP2004/002264, filed Mar. 5, 2004 and claims the benefit thereof. The International Application claims the benefits of German application No. 10321227.2, filed May 12, 2003, both applications are incorporated by reference herein in their entirety.

FIELD OF INVENTION

The invention relates to a method for data exchange between network elements which are arranged in different network domains.

SUMMARY OF THE INVENTION

The use of network node devices—for example routers or gateways—is known in order to support data exchange between network elements which are arranged in different local packet-oriented network domains.

A packet-oriented data exchange takes place, for example, using the 'Internet Protocol', also referred to in abbreviated form as IP. Although reference is made to the Internet Protocol in the remainder of the present description, the invention is not limited to the use of said protocol, but includes all packet-oriented communication methods in which data packets used for the data exchange are composed of a data part and a characterizing part—often referred to in the literature as a 'header'. In such packets the header typically contains a source address characterizing the sending network element and a destination address characterizing the network element designated to receive the data packets.

When addresses that are valid only within a first local network domain—'local' addresses—are used for addressing a network element, it is necessary to convert said local addresses that are valid in the first network into addresses that are valid for a second network domain in order to enable communication with network elements of said second network domain. In this case the respective IP address of the sending network element and the designated receiving network element is used as the source and destination address respectively. A corresponding method—known in technical circles as address translation or NAPT (Network Address and Port Translation) or NAT (Network Address Translation)—is typically performed by a network node device connecting the first and the second network, e.g. on the basis of assignment tables.

Various applications and communication protocols in which problems with the aforementioned address translation occur when they are used are cited in the document RFC 3027 (Request for Comment) of the IETF (Internet Engineering Task Force).

One category of applications prone to problems is represented by what are known as 'Bundled Session Applications' in which addressing information for their packet-oriented data exchange is also contained in a data part ('payload') of a respective data packet in addition to the addressing information contained in the header.

The communication protocols SIP ('Session Initiation Protocol') and H.323 known in technical circles are a particular example of bundled session applications of this kind.

Since the addressing information contained in the payload—just like that contained in the header—is usually domain-specific—that is to say, is only valid in a particular network domain—,said information has no validity after a transition into another network domain even if an address translation has taken place, because network node devices usually only translate address information contained in the header of such data packets in accordance with the NAT method.

Network node devices which are embodied as what are referred to as 'Application Layer Gateways', ALGs for short, provide an exception to this rule. Said ALGs also take into account address information contained in the payload for a NAT-like address translation. However, ALGs of said kind need to be set up specifically to handle the respective protocol and also exhibit runtime problems due to the computing time required for an evaluation and conversion of the payload data. Said ALGs are disadvantageous in particular in the case of a migration to more recent versions ('upgrade') of the communication protocol or application used. In such a case, as well as an upgrade of the communication protocol, it is disadvantageous that a modification of the software running in the ALG is generally also necessary. Furthermore, when ALGs of this kind are used, it must be ensured that such ALGs are to be used as direct communication partners for all network elements communicating across network domains, which cannot always be guaranteed.

The object of the invention is to specify means for data exchange between separate network elements having a network node device translating addressing information contained in a characterizing area of exchanged data packets, said means enabling an addressing of the sending network element that is valid in the respective opposite network domain to be guaranteed on the basis of the addressing information entered in a data area of exchanged data packets.

The object is achieved by the claims.

It is provided according to the invention that data packets sent by a network element arranged in a first network domain via a network node device translating addressing information in a characterizing area of exchanged data packets to a second network element arranged in a second network domain contain in their data area a source address that is valid in the second network domain. In this case the source address that is valid in the second network domain is held resident either locally in the first network element or on a central database.

A significant advantage of the method according to the invention is to be seen in the fact that a generic network node device—in particular a gateway or router—can be used to connect the two network domains without further administrative or organizational interventions.

The method according to the invention is advantageously to be implemented in the network elements, i.e. endpoints of a packet-oriented communication, and therefore requires only a small amount of programming overhead and in particular no interventions of any kind into the overall system or into switching network node devices.

Advantageous developments of the invention are specified in the dependent claims.

Advantageously, in addition to the source address that is valid in the destination network domain, the destination address that is valid therein is also entered in the data area.

In an analogous manner, the destination or, as the case may be, source address that is valid in the first network domain is advantageously transmitted by the second network element. A respective choice as regards in which direction a destination or source address that is valid in the respective opposite network domain is to be transmitted is also dependent, among other things, on for which network domains an address translation is to be performed. In addition to a bidirectional address translation explained in the description of the figures, this can also perfectly well be performed only unidirectionally, for example during the transition from the first into the second network domain, though not during the transition from the second into the first network domain. Depending on the prevailing circumstances, the person skilled in the art will choose a favorable implementation for the particular area of application using the means of the idea according to the invention.

An inquiry ('discovery') procedure for determining the source and/or destination address that is valid in the respective other network domain is particularly advantageous. A discovery procedure of said kind ensures a dynamic determination of the respective address without the need to refer back to saved values. This advantageously eliminates the need to maintain/update a pool of addresses stored in a central database or, as the case may be, in a memory area assigned to the respective network element.

An exemplary embodiment with further advantages and developments of the invention will be explained in more detail below with reference to the figures of the drawing.

BRIEF DESCRIPTION OF THE DRAWINGS

FIG. 3A: shows a chronological flow diagram for schematically representing a packet-oriented discovery procedure in a first embodiment;

DETAILED DESCRIPTION OF INVENTION

Figure 1:
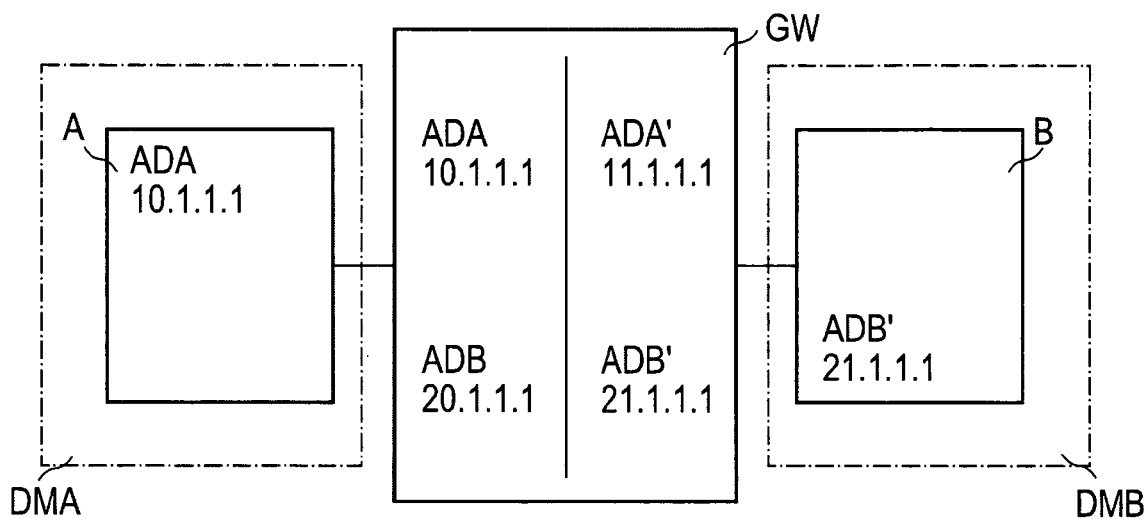
FIG. 1: shows a structogram for schematically representing two network domains with a network node device connecting said network domains.

FIG. 1 shows a first network domain DMA and a second network domain DMB with a network node device GW (gateway) connecting the two network domains DMA, DMB. The network domains DMA, DMB are represented in the drawing by a dashed-dotted line in each case.

A first network element A is arranged in the first network domain DMA, while a second network element B is arranged in the second network domain DMB. In addition to the said network elements A, B, further network elements (not shown) can be arranged as necessary in the respective network domain DMA, DMB. Furthermore, in addition to the network node device GW, further network node devices (not shown) can be deployed as necessary for connecting the network domains DMA, DMB.

The first network element A is assigned an address ADA that is valid in the first network domain DMA. The address ADA assigned to the first network element A is preferably present as an IP ('Internet Protocol') address, although the invention is not limited to the use of the associated Internet Protocol. An exemplary value of '10.1.1.1' is assumed for the value of the address ADA, which value is assigned to the first network element A and valid in the first network domain DMA.

The second network element B is assigned an address ADB that is valid in the first network domain DMA and has the value '20.1.1.1'. An address ADB' that is valid in the second network domain DMB for the second network element B and has the value '21.1.1.1' is noted in FIG. 1. The second network element B addressed in the first network domain DMA by means of the address ADB and the value 20.1.1.1 is translated by the network node device GW into the address ADB' that is valid in the second network domain DMB and has the value 21.1.1.1. Similarly, the first network element A addressed in the second network domain DMB by means of the address ADA' and a value '11.1.1.1' is translated by the network node device GW into the address ADA that is valid in the first network domain DMA and has the value 10.1.1.1. In this case the respective translation of the addresses is performed in the network node device using a method known as 'Network Address Translation' or NAT for short.

In the representation of the network node device GW there is shown, in the left-hand area facing the first network domain DMA, the address ADA of the first network element A that is valid in the first network domain DMA and the address ADB of the second network element B that is valid in the first network domain DMA and, in the right-hand area facing the second network domain DMB, the address ADA' of the first network element A that is valid in the second network domain DMB and the address ADB' of the second network element B that is valid in the second network domain DMB. Accordingly, the apostrophe (') in the respective reference symbol indicates that addresses ADA', ADB' of a network element A, B that are identified in this way are valid in the second network domain DMB.

In this case the respective address ADA, ADB, ADA', ADB' is to be understood as an address ADA, ADB, ADA', ADB' used as a source or destination address according to the application.

Figure 2:
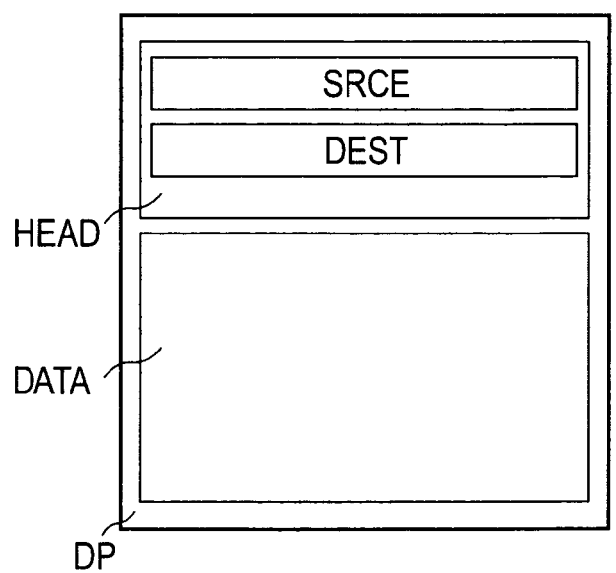
FIG. 2: shows a structure of an exchanged data packet.

FIG. 2 shows a structure of a data packet DP used for packet-oriented data exchange. The data packet DP is subdivided into a characterizing part HEAD, also referred to as the 'header', and a part DATA containing data to be transported, also referred to as the 'payload'. The characterizing part HEAD typically contains information SRCE characterizing the sender ('source') and information DEST characterizing the recipient ('destination').

An exchange of packet-oriented messages will be explained in more detail below with further reference to the functional units of the respective preceding figures.

FIG. 3A shows a chronological flow diagram for schematically representing a packet-oriented discovery procedure in a first embodiment.

Time lines 1, 2, 3 are assigned in this order to the first network element A, the network node device GW and the second network element B. The time lines A, GW, B run from top to bottom, so later times t are located lower down than earlier times.

In the discovery procedure described below it is assumed that network node devices GW are provided in all network domains DMA, DMB which perform an address translation according to the NAT method exclusively in a characterizing part of the data packets DP to be exchanged. Thus, in particular no use is made of above described ALGs (Application Layer Gateways) which also translate the address information in the data part DATA of data packets to be exchanged.

In order to perform the discovery procedure, in a first embodiment the two network elements A, B exchange data packets DP1, DP1', DP2, DP2' in a predefined format. With regard to the predefined format, a specific form or marker in the form of an 'identifier' or 'flag', for example, can be provided in the data part DATA or in the characterizing part HEAD. In the embodiment shown here, a keyword 'NAT Dscv' provided in the respective data part DATA1, DATA2 of the exchanged data packets DP1, DP1', DP2, DP2' is assumed, where 'Dscv' stands for the discovery process ('Discovery') to be described in the following.

At a first time the first network element A sends a data packet DP1. The network address ADA of the first network element A that is valid in the first network domain is entered as source SRCE and the network address ADB of the second network element B that is valid in the first network domain is entered as destination DEST in a part HEAD1 characterizing the data packet DP1.

The first data packet DP1 is received at the network node device GW. In the characterizing part HEAD1, the read-out destination and source addresses ADA; ADB that are valid in the first network domain DMA are translated according to the NAT method into the destination and source addresses ADA'; ADB' that are valid in the second network domain DMB. Following said NAT processing, the first data packet DP1 is forwarded at a time subsequent thereto with a modified characterizing part HEAD1' as data packet DP1' to the second network element B.

The second network element B receives the data packet DP1' and deduces from the entry 'NAT Dscv' in the data part DATA1 that said data packet is initiating a discovery procedure. The second network element B thereupon reads out the source and destination address ADA', ADB' of the received data packet DP1' and stores them.

At a later point in time, the second network element B generates a response data packet DP2 which contains a keyword 'NAT Dscv RSP' in an associated data part DATA2 and thus indicates an answer ('response') to the discovery procedure initiated by the first data packet DP1.

The network address ADB' of the second network element B that is valid in the second network domain DMB is entered as source SRCE in an area HEAD2 characterizing the second data packet DP2 and the network address ADA' of the first network element A that is valid in the second network domain DMB is entered as destination DEST. In order to generate source SRCE and destination DEST of the response data packet DP2, therefore, the information on the source SRCE and destination DEST taken from the data packet DP1 received beforehand has been transposed.

The value of the address ADA' of the network element A that is valid in the second network domain DMB is also entered in the data part DATA2 of the response data packet DP2.

The response data packet DP2 is sent to the network node device GW and forwarded by the latter with analogous— already described—NAT modifications as a modified response message DP2' to the first network element A which takes the value of the address ADA' of the network element A that is valid in the second network domain DMB from the data part DATA2 of the modified response message DP2' and stores said value.

The described exchange of data packets DP1, DP1', DP2, DP2' is now followed by a further exchange of data packets, with this further data packet exchange (not shown) being performed analogously to that depicted here and this time being initiated by the second network element B. Upon completion of this exchange there is stored in the second network element B a value of its address ADB that is valid in the first network domain DMA. The discovery procedure is thus completed. Without counting the data packets DP1', DP2' forwarded by the network node device GW, an exchange of four data packets is necessary for the discovery procedure according to this first embodiment.

Figure 3B:
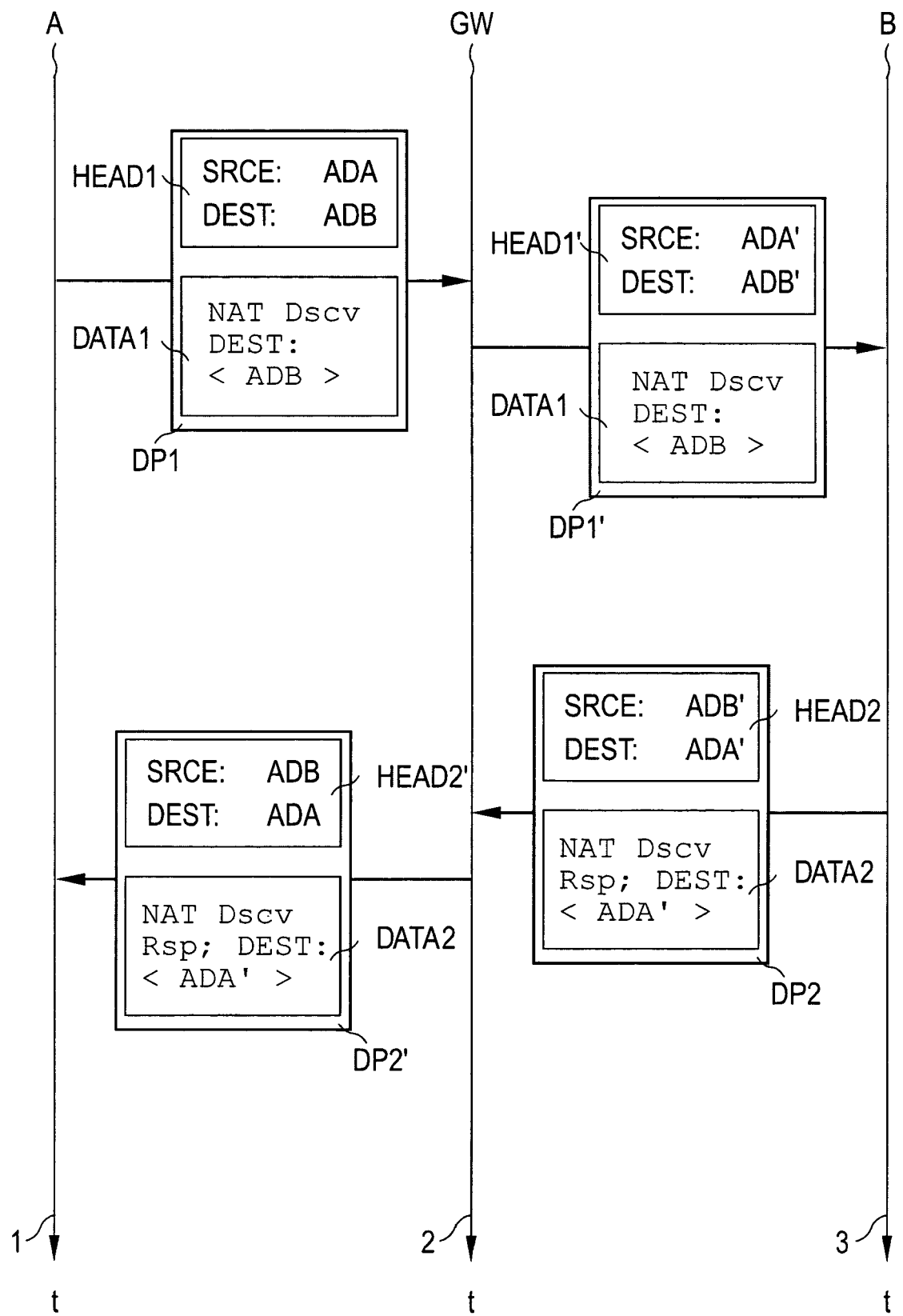
FIG. 3B: shows a chronological flow diagram for schematically representing a packet-oriented discovery procedure in a second embodiment.

FIG. 3B shows a second embodiment of a discovery procedure. Instead of a data packet exchange taking place in each direction independently of one another as in the previous exemplary embodiment, in this exemplary embodiment—without counting the data packets DP1', DP2' forwarded by the network node device GW—only two data packets DP1, DP2 are exchanged.

For this purpose the network element A already inserts destination information DEST in the first data part DATA1 of the first data packet DP1, said information indicating to which address this first data packet DP1 is sent from the viewpoint of the network element A, in other words to the destination address ADB of the second network element B that is valid in the first network domain DMA.

The network element B can use this information already upon reception in order to discover which address ADB it possesses in the first network domain DMA.

As in the preceding exemplary embodiment, the network element B then inserts destination information DEST in the data part DATA2 of the response message DP2, said information indicating at which address ADA' said network element sees the network element A.

Following reception of the second data packet DP2' modified in the usual way by the network node device GW at the first network element A, the two network elements A, B each know their "translated" addresses ADA', ADB, hence the addresses ADA', ADB under which it addresses the respective other network element B; A in the opposite network domain DMB, DMA.

Figure 4:
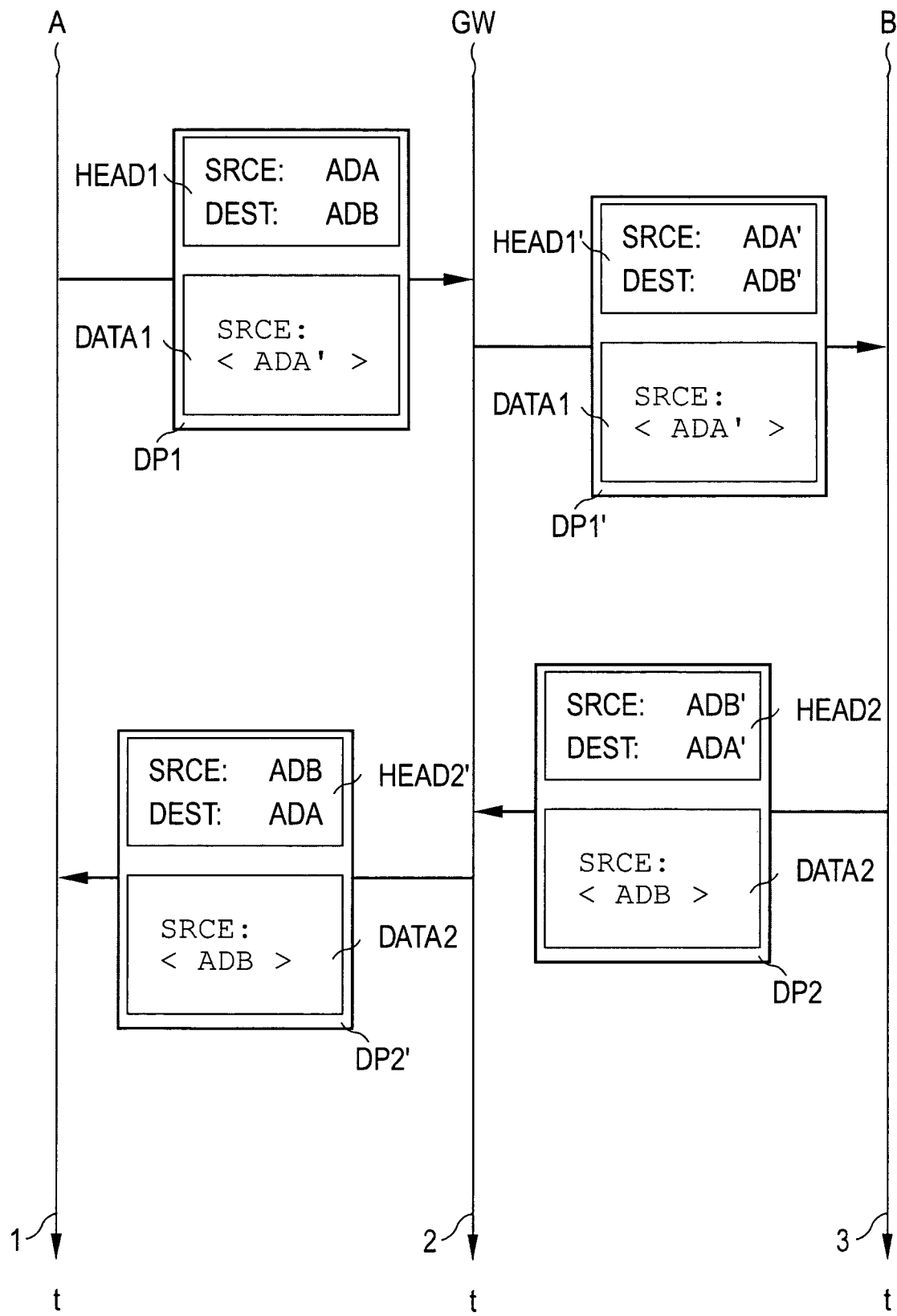
FIG. 4: shows a chronological flow diagram for schematically representing a packet-oriented data exchange.

FIG. 4 shows a possible data exchange according to the discovery procedure. Knowing a source address ADA'; ADB in the respective opposite network domain DMB, DMA, the respective sending network element A; B sends the respective address ADA'; ADB that is valid in the other network domain DMB; DMA as source specification SRCE in a data part DATA1; DATA2 of exchanged data packets DP1, DP1'; DP2, DP2'. Furthermore, the respective recipient A; B of its address ADA'; ADB that is valid in the respective other network domain DMB; DMA no longer uses (as previously) its 'actual' address, i.e. the IP address that is valid in its own network domain DMA; DMB, in the data part of sent data packets for the communication with the partner network element B; A, but the address that was communicated to it by the partner network element B; A, i.e. the address under which it is known to its communication partner B; A.

Using the means according to the invention a solution of an exchange of data in what is known as internet telephony using VoIP ('Voice over Internet Protocol') communication terminals is possible in conjunction with NAT. It is known from internet telephony in particular that translation of IP addresses can represent a problem for VoIP communication terminals when the latter are based on the Internet Protocol.

Currently common switching protocols such as H.323 or SIP are dependent on transmitting IP addresses in the data part of IP packets. Problems of this kind therefore always occur when network node devices GW operating with NAT only translate the IP addresses in the header HEAD of the IP packets, but not in the data part DATA.

In an embodiment of the method according to FIG. 4—where network elements A, B shown therein are to be equated with VoIP terminals A, B—an initiator of a communication taking place according to the H.225 standard communicates to the associated communication partner B, A in what is referred to as a 'user-user' part of a SETUP message the IP address by means of which it is addressed. In this way said communication partner B, A learns under which IP address it is visible for the initiator, without independently having to conduct a different 'NAT discovery' procedure. In return, the communication partner communicates to the initiator of the communication in the user-user part according to H.225 in an 'ALERT' message or in a 'CONNECT' message the IP address under which said initiator is visible. By this means the initiator can also save on a different NAT discovery procedure.

In addition to its use for NAT scenarios, the method is also useful for scenarios in which a NAT method is not used, in cases in which an application has difficulties in determining its own IP address. This is the case, for example, when VPN ('Virtual Private Network') clients are used, if said clients do not provide their own so-called 'virtual adapter'.

An application wanting to access encryption services of a VPN client must not use an easily accessible IP address of a 'physical adapter', but must access the IP address of the VPN client. If it is not possible on an associated system to access said address via standard APIs ('Application Programming Interfaces'), then the method according to the invention allows an application the opportunity of discovering its own address by inquiring with the communication partner.

The invention claimed is:

1. A method for data exchange between network elements, wherein
   a first network element is arranged in a first network domain with an address valid in the first network domain, wherein
   a second network element is arranged in a second network domain with an address valid in the second network domain, wherein
   a network node device is arranged between the network domains for forwarding a data packet to be sent by the first network element to the second network element, wherein
   the data packet comprises a characterizing part and a data part, wherein
   a destination address characterizing a receiving network element in the characterizing part of the data packet is translated under the control of the network node device into a destination address valid in the second network domain, the method comprising an address discovery comprising:
   sending a message by the first network element to the second network element arranged in the second network domain with a destination address of the second network element that is contained in the data part and is valid in the first network domain;
   receiving the message by the second network element and storing the destination address of the second network element valid in the first network domain;
   sending a response message by the second network element to the first network element with a destination address of the first network element that is contained in the data part and is valid in the second network domain; and
   receiving the response message by the first network element and storing the destination address of the first network element valid in the second network domain,
   the method further comprising entering into the data part by the first network element a source address of the first network element valid in the second network domain.

2. The method as claimed in claim 1, wherein, in order to forward a data packet to be sent by the second network element to the first network element, the second network element enters in the data part the source address to be specified in the data part of the data packet as the source address of the second network element valid in the first network domain.

3. The method as claimed in claim 1, wherein the method is performed by a computer program product when the computer program product is executed on a computer unit assigned to a network element.

4. The method of claim 1, the address discovery further comprising:
   sending a message by the first network element to the second network element arranged in the second network domain with a source address of the first network element that is contained in the data part and is valid in the first network domain;
   receiving the message by the second network element and storing the source address of the first network element valid in the first network domain;
   sending a response message by the second network element to the first network element with a source address of the second network element that is contained in the data part and is valid in the second network domain; and
   receiving the response message by the first network element and storing the source address of the second network element valid in the second network domain.

5. The method as claimed in claim 4, wherein the first network element enters in the data part a destination address of the second network element that is to be specified in the data part of the data packet as the destination address of the second network element valid in the second network domain.

6. The method as claimed in claim 5, wherein, in order to forward a data packet to be sent by the second network element to the first network element, the second network element enters in the data part the source address to be specified in the data part of the data packet as the source address of the second network element valid in the first network domain.

7. The method as claimed in claim 5, wherein, in order to forward a data packet to be sent by the second network element to the first network element, the second network element enters in the data part the destination address of the first network element to be specified in the data part of the data packet as the destination address valid in the first network domain.

8. The method as claimed in claim 4, wherein, in order to forward a data packet to be sent by the second network element to the first network element, the second network element enters in The data part the source address to be specified in the data part of the data packet as the source address of the second network element valid in the first network domain.

9. The method as claimed in claim 8, wherein, in order to forward a data packet to be sent by the first network element to the second network element, the first network element enters in the data part the destination address of the second network element to be specified in the data part of the data packet as the destination address valid in the second network domain.

10. The method as claimed in claim 9, wherein, in order to forward a data packet to be sent by the second network element to the first network element, the second network element enters in the data part the destination address of the first network element to be specified in the data part of the data packet as the destination address valid in the first network domain.

11. The method as claimed in claim 4 wherein, in order to forward a data packet to be sent by the second network clement to the first network element, the second network element enters in the data part the destination address of the first network element to be specified in the data part of the data packet as the destination address valid in the first network domain.

12. Computer readable medium comprising program code for performing data exchange between network elements in a system when the program code is executed on a computer unit assigned to the network elements, wherein the system comprises:

a first network element arranged in a first network domain with an address valid in the first network domain;

a second network element arranged in a second network domain with an address valid in the second network domain;

a network node device arranged between the network domains for forwarding a data packet to be sent by the first network element to the second network element, wherein the data packet comprises a characterizing part and a data part, wherein a destination address characterizing a receiving network element in the characterizing part of the data packet is translated under the control of the network node device into a destination address valid in the second network domain, wherein The code causes the computer to execute an address discovery comprising:

sending a message from the first network element to the second network element arranged in the second network domain with a destination address of the second network element that is valid in the first network domain encoded in the data part;

receiving the message by the second network element and storing the destination address of the second network element valid in the first network domain;

sending a response message from the second network element to the first network element with a destination address of the first network that is valid in the second network domain encoded in the data part; and receiving the response message by the first network element and storing the destination address of the first network element valid in the second network domain, and and the code then encodes into the data part of data packets a source address of the first network element valid in the second network domain.

13. The computer readable medium comprising program code for performing data exchange between network elements in a system when the program code is executed on a computer unit assigned to the network elements of claim 12, wherein the address discovery further comprises:

sending a message by the first network element to the second network element arranged in the second network domain with a source address of the first network element that is contained in the data part and is valid in the first network domain;

receiving the message by the second network element and storing the source address of the first network element valid in the first network domain;

sending a response message by the second network clement to the first network element with a source address of the second network element that is contained in the data part and is valid in the second network domain; and receiving the response message by the first network element and storing the source address of the second network element valid in the second network domain.

* * * * *